US008501069B1

(12) United States Patent
Williamson et al.

(10) Patent No.: US 8,501,069 B1
(45) Date of Patent: *Aug. 6, 2013

(54) RESIN PANELS, METHODS, AND APPARATUS FOR MAKING RESIN PANELS

(75) Inventors: Kirk D. Williamson, Orem, UT (US); Doug E. Thompson, Pleasant Grove, UT (US)

(73) Assignee: Giovanni Holdings, LLC, Lindon, UT (US)

( * ) Notice: Subject to any disclaimer, the term of this patent is extended or adjusted under 35 U.S.C. 154(b) by 193 days.

This patent is subject to a terminal disclaimer.

(21) Appl. No.: 12/916,293

(22) Filed: Oct. 29, 2010

Related U.S. Application Data

(63) Continuation-in-part of application No. 11/726,727, filed on Mar. 21, 2007.

(51) Int. Cl.
*B29C 41/22* (2006.01)

(52) U.S. Cl.
USPC ............................. 264/259; 264/299; 264/308

(58) Field of Classification Search
USPC .......................................... 264/259, 299, 308
See application file for complete search history.

(56) References Cited

U.S. PATENT DOCUMENTS

| | | | |
|---|---|---|---|
| 3,330,712 A | 7/1967 | Rowe | |
| 3,331,175 A | 7/1967 | Terrio | |
| 3,504,063 A | 3/1970 | Lemelson | |
| 3,520,509 A | 7/1970 | Carey | |
| 4,478,963 A | 10/1984 | McGarry | |
| 5,223,598 A | 6/1993 | Yamada et al. | |
| 5,547,737 A | 8/1996 | Evans et al. | |
| 5,766,500 A | 6/1998 | Bordener | |
| 6,578,476 B2 | 6/2003 | Liguori et al. | |
| 6,686,315 B1 * | 2/2004 | Creed | ............................ 503/227 |
| 6,699,419 B1 | 3/2004 | Kia et al. | |

(Continued)

FOREIGN PATENT DOCUMENTS

EP 0 600 187 6/1994

OTHER PUBLICATIONS

International Searching Authority; United States Patent and Trademark Office, "International Search Report," in related PCT application No. PCT/US2008/003769, mailed Jul. 25, 2008.

*Primary Examiner* — James Sanders
(74) *Attorney, Agent, or Firm* — Durham Jones & Pinegar Intellectual Property Law Group

(57) ABSTRACT

A process is described for making a resin panel having a grid support backing, comprising (a) applying a layer of liquid gelcoat or first resin to a surface of a mold and allowing the gelcoat or first resin to harden as a surface layer, (b) applying a layer of liquid second resin to a surface of the surface layer, (c) affixing a support grid on top of the layer of liquid second resin, (d) curing the liquid second resin at ambient temperature and pressure, so that the support grid is integral with the cured layer of resin to form a resin panel, and (e) removing the resin panel from the mold. A process is described for making a patterned resin panel, comprising (a) applying a layer of liquid resin to a surface of a mold, (b) applying a medium with the pattern printed on one side to the layer of liquid resin, with a side of the medium having the pattern being in contact with the liquid resin, (c) curing the layer of liquid resin at ambient temperature and pressure, to transfer the pattern from the medium to the layer of liquid resin, and (d) removing the medium from the cured resin.

15 Claims, 14 Drawing Sheets

U.S. PATENT DOCUMENTS

| | | |
|---|---|---|
| 6,964,722 B2 * | 11/2005 | Taylor et al. .................. 156/230 |
| 7,001,660 B2 | 2/2006 | Garitano |
| 7,108,890 B2 | 9/2006 | Horne et al. |
| 7,520,217 B2 | 4/2009 | Roberts et al. |
| 2003/0008112 A1 | 1/2003 | Cole et al. |
| 2004/0089407 A1 * | 5/2004 | Halewood .................... 156/230 |
| 2005/0227006 A1 | 10/2005 | Segall |
| 2006/0126141 A1 | 6/2006 | Hirao et al. |
| 2006/0203058 A1 | 9/2006 | Nerad et al. |
| 2007/0020459 A1 | 1/2007 | Roberts et al. |

* cited by examiner

RESIN PANELS, METHODS, AND APPARATUS FOR MAKING RESIN PANELS

CROSS-REFERENCE TO RELATED APPLICATIONS

This application is a continuation-in-part of U.S. application Ser. No. 11/726,727, filed Mar. 21, 2007, which is hereby incorporated by reference in its entirety.

STATEMENT REGARDING FEDERALLY SPONSORED RESEARCH OR DEVELOPMENT

Not applicable.

BACKGROUND OF THE INVENTION

The present invention relates to resin panels and methods and apparatus for making resin panels. More particularly, the present invention provides methods and apparatus for making resin panels, plain or patterned, at ambient temperature and pressure and/or having a structured support backing, and the resulting resin panels.

Numerous processes are currently utilized for making resin-based panels, such as interior panels that are used on walls and counters in kitchens and bathrooms. The panels may be molded with a matrix, such as cultured marble, combined with the resin and allowed to cure. Such composite substrates have become very popular for a variety of home uses, in particular for kitchen and bathroom surfaces because of their strength, durability, resistance to staining, and ease in cleaning.

Resin panels are often patterned for ornamental purposes. To make a patterned resin panel, images have been applied to substrates from transfer media having an image thereon in dyes capable of sublimation. In some cases, a substrate is formed and cured before applying transfer media. A gel coating may first be applied to a substrate, and the gel coat is also allowed to cure. Then the transfer media having a image formed by sublimable ink is brought into contact with the substrate or coating, and heat and/or pressure are applied to cause the image to sublimate into the substrate or coating.

Commonly, a large and expensive heat press is employed to apply substantial heat and pressure to facilitate the image transfer. See, for example, U.S. Pat. No. 7,520,217 (Roberts et al.). Moreover, it is also necessary to apply a protective layer of clear resin or acrylic layer over the image to protect it from ultraviolet rays that would otherwise cause the image to fade in sunlight.

Molded or cast resin panels are typically 4 by 8 feet (121.92 cm by 243.84 cm) in size, so making a resin panel requires a substantial amount of resin. In recent years, resin prices have increased substantially, so the costs of making such resin panels have become almost prohibitive. Moreover, the weights and sizes of resin panels make it difficult to transport and assemble them with other panels in a bathroom or kitchen.

In some instances, lightweight resin panels have been constructed with a honeycomb core sandwiched between two panel surfaces, as shown in U.S. Pat. No. 5,547,737 (Evans et al.). This type of construction results in a thick, dense bulky resin panel that has limited uses and could not be utilized in bathroom or kitchen applications.

BRIEF SUMMARY OF THE INVENTION

The present invention comprises a process for making a resin panel having a support grid backing, comprising applying a layer of gelcoat or first resin in liquid form to a surface of a mold and permitting the gelcoat or first resin to harden as a surface layer, applying a layer of second resin in liquid form to a surface of the surface layer, affixing a support grid on top of the layer of second resin, curing the second resin at ambient temperature and pressure, so that the support grid is integral with the layer of second resin to form a resin panel, and removing the resin panel from the mold. The present invention also comprises a resin panel having a layer of cured resin and a support grid integral with the layer of cured resin.

The present invention also comprises a process for making a resin panel that carries a pattern. As used herein, the terms "pattern" and "image" include, but are not limited to, patterns, designs, images and colors. A resin panel that carries a "pattern" may be referred to herein as a "patterned resin panel." A process for making a patterned resin panel comprises applying a layer of resin in liquid form to a surface of a flat mold, applying a medium with a pattern printed on one side thereof to the layer of resin, with a side of the medium that carries the pattern also contacting the resin, curing the resin at ambient temperature and pressure to transfer the pattern from the medium to the resin, and removing the medium from the resin. The present invention also comprises a resin panel having a layer of resin with a pattern transferred to resin layer at ambient temperature and pressure prior to curing of the resin.

DETAILED DESCRIPTION

Figure 1:
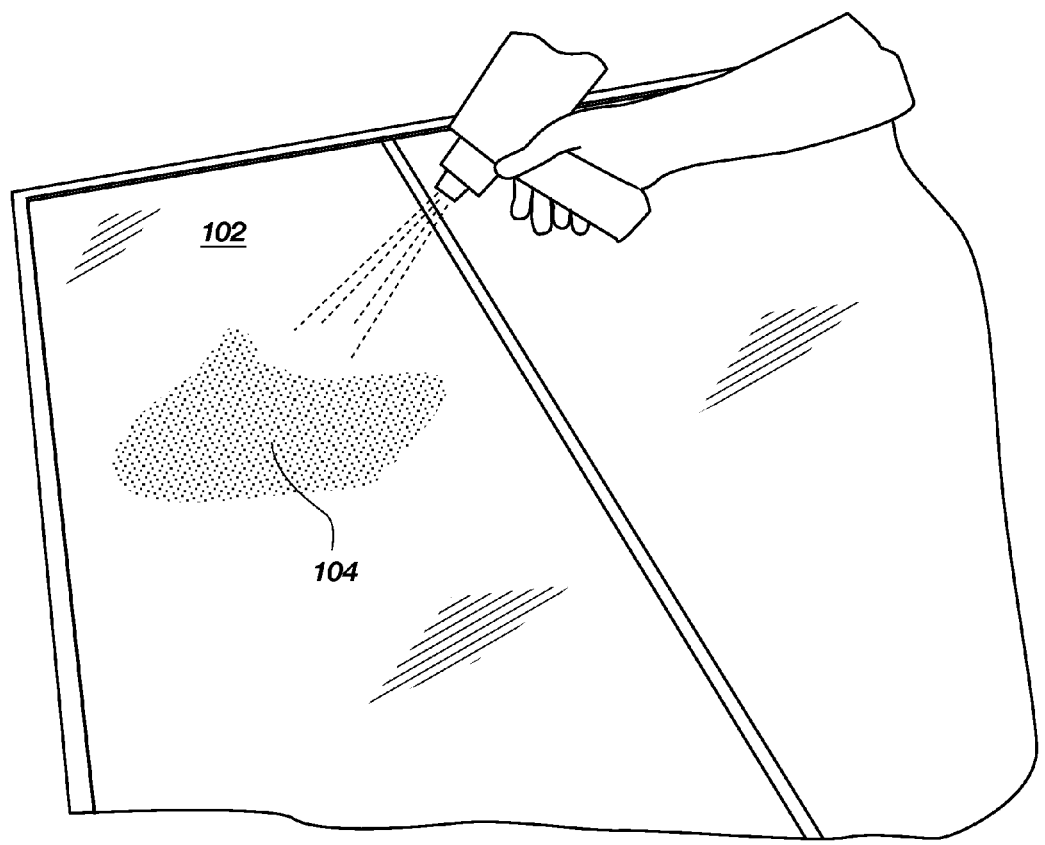
FIGS. 1-10 are a series of perspective views showing a process according to the present invention for making a resin panel with a honeycomb backing.

Before the present resin panels, methods, and apparatus for making resin panels are disclosed and described, it is to be understood that this invention is not limited to the particular configurations, process steps, and materials disclosed herein, as such configurations, process steps, and materials may vary somewhat. It is also to be understood that the terminology employed herein is used only for the purpose of describing particular embodiments and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise.

Unless defined otherwise, all technical and scientific terms used herein have the same meanings as commonly understood by one of ordinary skill in the art to which this invention belongs.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of." As used herein, "consisting of" and grammatical equivalents thereof exclude any element, step, or ingredient not specified in the claim. As used herein, "consisting essentially of" and grammatical equivalents thereof limit the scope of a claim to the specified materials or steps and those that do not materially affect the basic and novel characteristic or characteristics of the claimed invention.

The present invention provides a resin panel that is relatively simple and inexpensive to make. In embodiments where the resin panel comprises a polygonal backing or similar backing, the composite resin panel requires substantially less resin is required than in a standard resin panel. Moreover, a composite resin panel made according to the present invention is relatively lightweight and easy to transport and assemble. In addition, the present invention provides a resin panel made according to the present invention having a pattern, design, image or color thereon, which resin panel may be easily manufactured at room temperatures and pressures.

Resin Panel with Polygonal Backing

In FIGS. 1-10, a process is shown according to the present invention, wherein a resin panel is formed with a polygonal resin backing. Looking first at FIG. 1, a pouring table 102, which may include a glass surface, is sprayed with a gelcoat to about 18 mils to 20 mils (about 0.046 cm to 0.051 cm) in thickness to form a layer 104. The gelcoat is a modified resin that is applied in a liquid state. It is composed of an epoxy or unsaturated polyester resin material used to provide a high-quality finish on the visible surface of a fiber-reinforced composite material. The gelcoat is allowed to cure to form cross-linked polymers for a strong finish on the surface of the resin panel being formed. The gelcoat may be clear or pigmented.

As an alternative to using gelcoat for layer 104, one may use a solid surface polyester liquid resin that provides a hard, stain resistant surface. The solid surface resin layer 104 may include a pigment and a catalyst. As an example, an isophthalic resin with an additive, such as neopentyl glycol, may be applied with a roller in an even layer about 30 mils (about 0.076 cm) thick. The pigment is typically white, but can be any other color, as selected.

Figure 2:
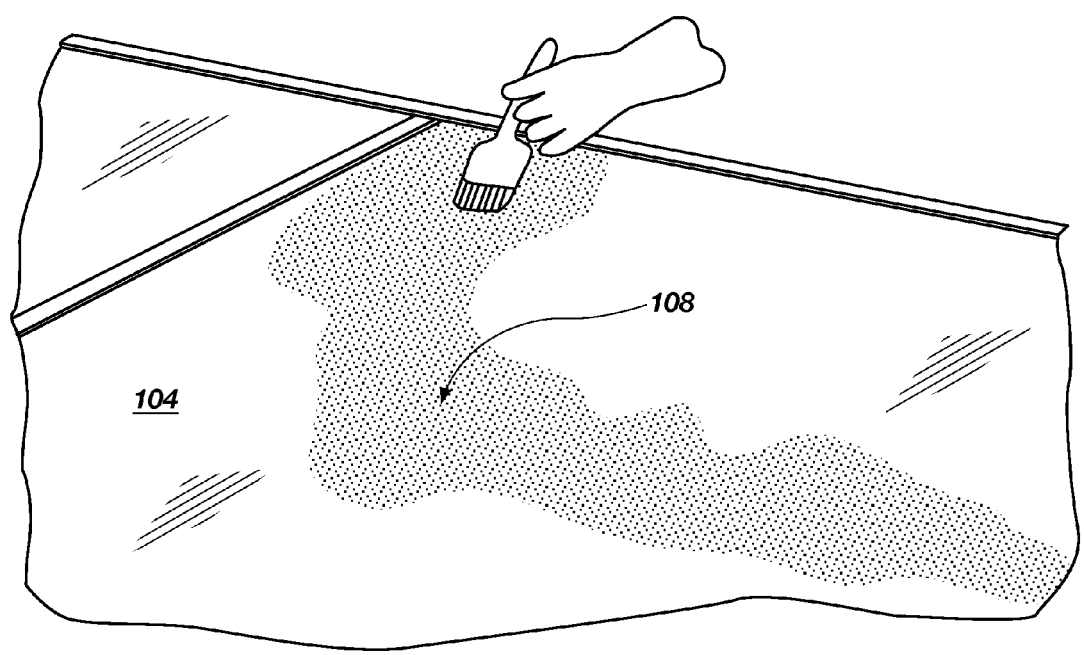

Next, as shown in FIG. 2, after the gelcoat or other resin of layer 104 has cured, a thin layer 108 of resin, pigment, and catalyst is brushed on the surface of layer 104 and spread out evenly. The resin used in thin layer 108 may comprise a resin used with cultured marble (referred to herein as "marble resin"), such as an orthophthalic polyester resin. The catalyst may be any type of chemical that facilitates or promotes room-temperature curing of the marble resin, such as methyl ethyl ketone peroxide (MEKP) initiator. The pigment provides color, for example, white.

Figure 3:
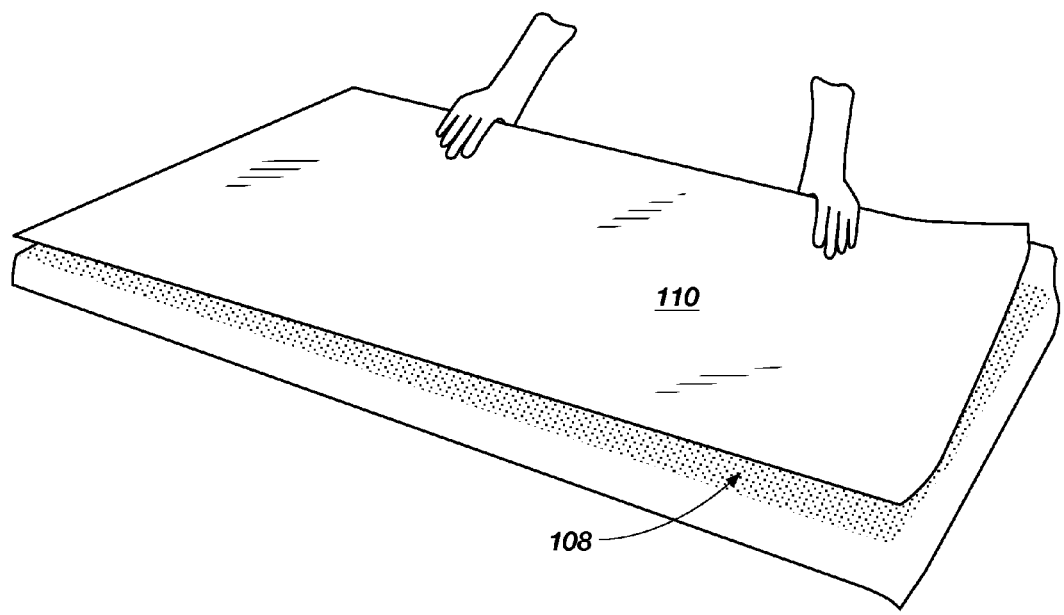

Looking next at FIG. 3, a support mat 110 may be laid down on the surface of the marble resin of thin layer 108. This support mat 110 is optional, but including support mat 110 provides additional strength to the resulting resin panel. Support mat 110 may be comprised of chopped fiberglass strands held together by an adhesive binder, which is very economical and offers good stiffness. Alternately, for greater strength and a lower weight product, biaxials and woven cloth fabrics may be used. Support mat 110 may be compatible for use with polyester resins and/or vinyl ester resin.

Figure 4:
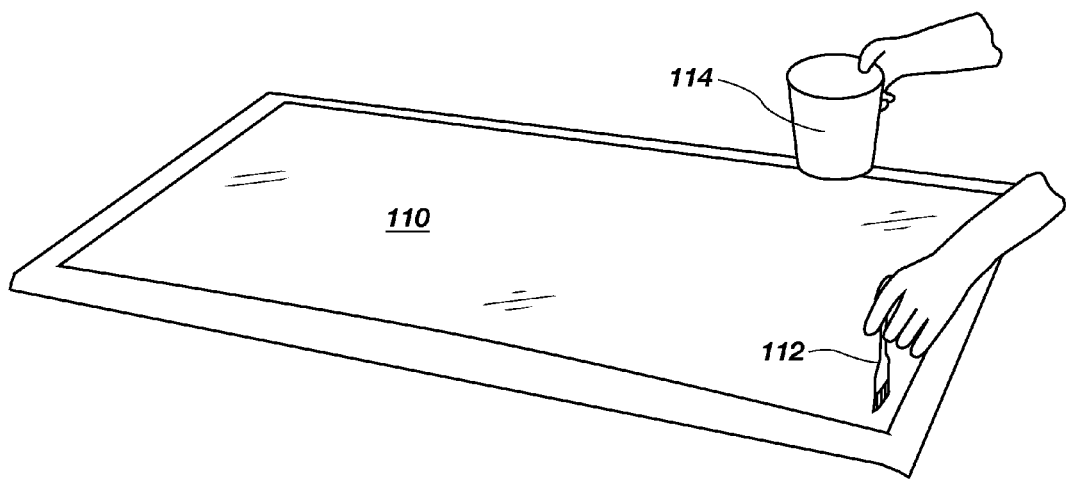
Figure 5:
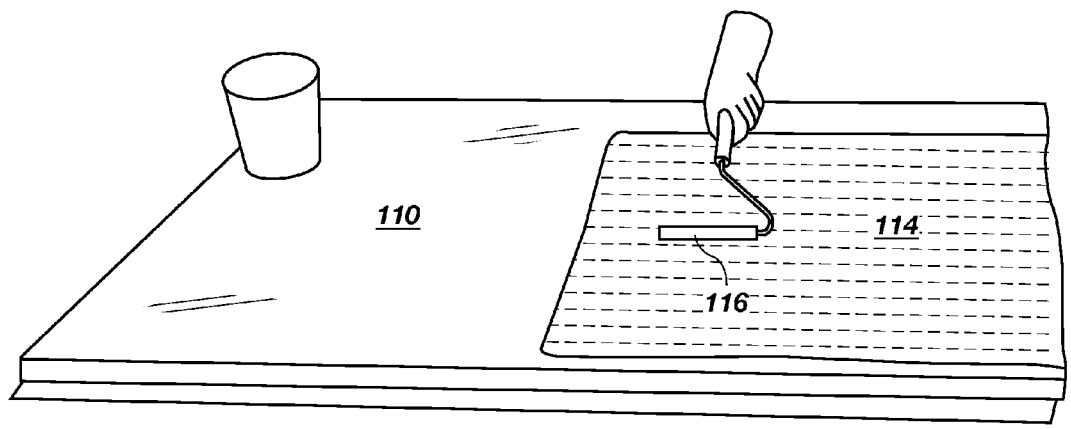

Referring to FIG. 4, support mat 110 is dabbed with a brush 112 and more marble resin 114. As shown in FIG. 5, support mat 110 is then saturated with marble resin using a roller 116. Support mat 110 may require approximately 1.5 to 2 times its own weight in resin for complete saturation.

Figure 6:
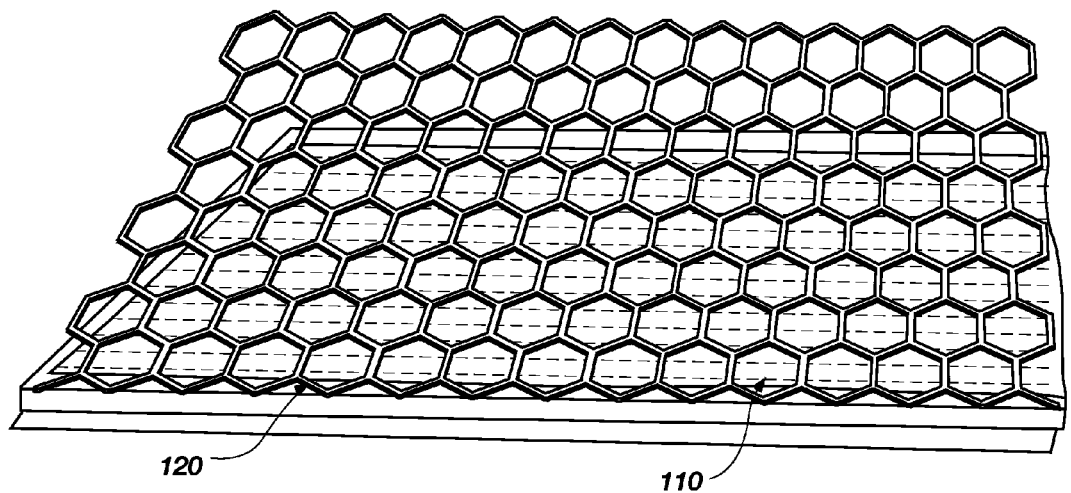

Next, as shown in FIG. 6, a structured grid 120 is applied to support mat 110. Structured grid 120 is a thin structured or patterned grid comprising a cured resin with a filler and a catalyst, referred to herein as a "marble matrix." A process for using the marble matrix to fabricate structured grid 120 is shown in FIGS. 8-10.

Figure 7:
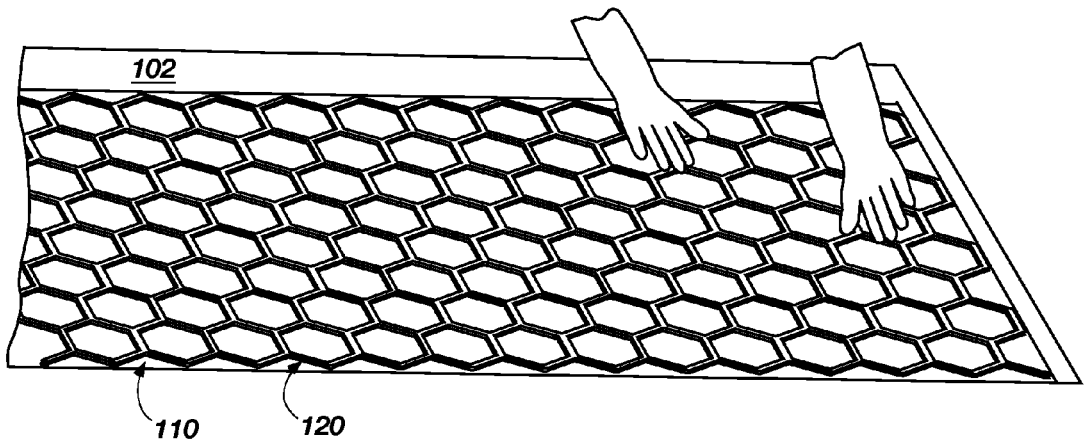

Referring next to FIG. 7, structured grid 120 is pushed down firmly on support mat 110 so that support mat 110 and structured grid 120 will become integrated as the marble resin that saturates support mat 110 cures. Pouring table 102 is then set in a curing rack until the marble resin saturating support mat 110 and structured grid 120 has cured and become solid to form a lightweight, strong resin panel (not shown). Then the resin panel is removed from pouring table 102 for further detailing, if needed.

Figure 8:
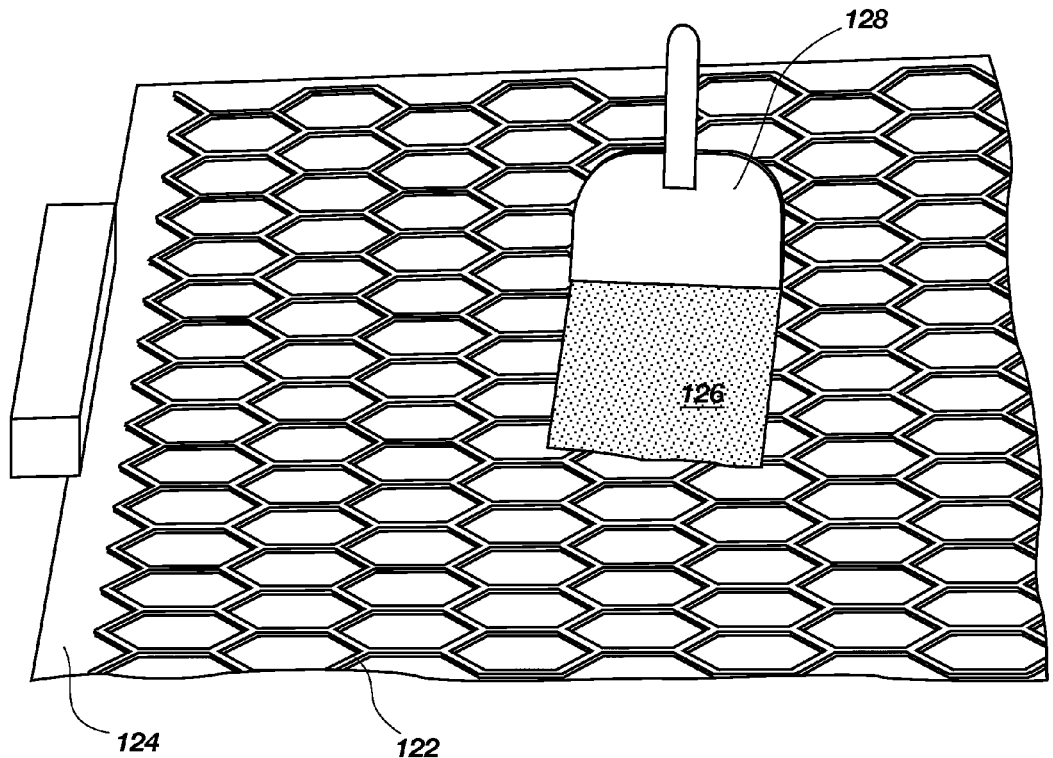

Looking at FIG. 8, a process for forming structured grid 120 is shown. A mold 122 is placed on a pouring table 124 and covered with a marble matrix 126 having a filler for strength and including a catalyst. Any excess marble matrix 126 is removed by a hand trowel 128. Marble matrix 126 may be comprised of any type of resin, such as marble resin or a solid surface resin, having substantial strength when cured. The filler may be a cultured marble filler, such as limestone (calcium carbonate). The catalyst may be any type of catalyst that promotes curing of the resin, such as methyl ethyl ketone peroxide (MEKP) initiator. Marble matrix 126 may also include a pigment.

Figure 9:
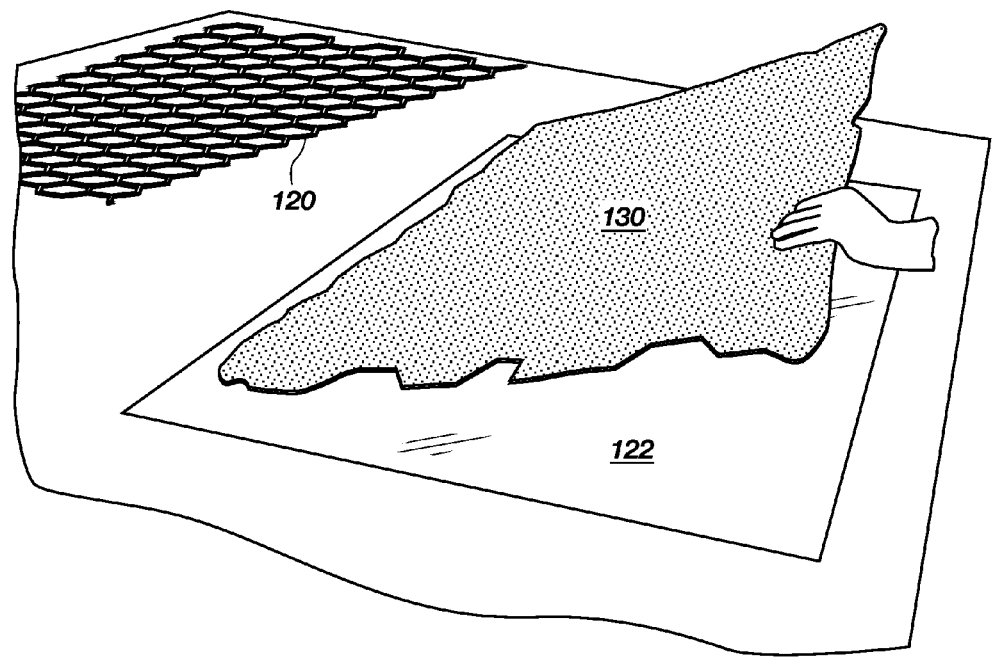
Figure 10:
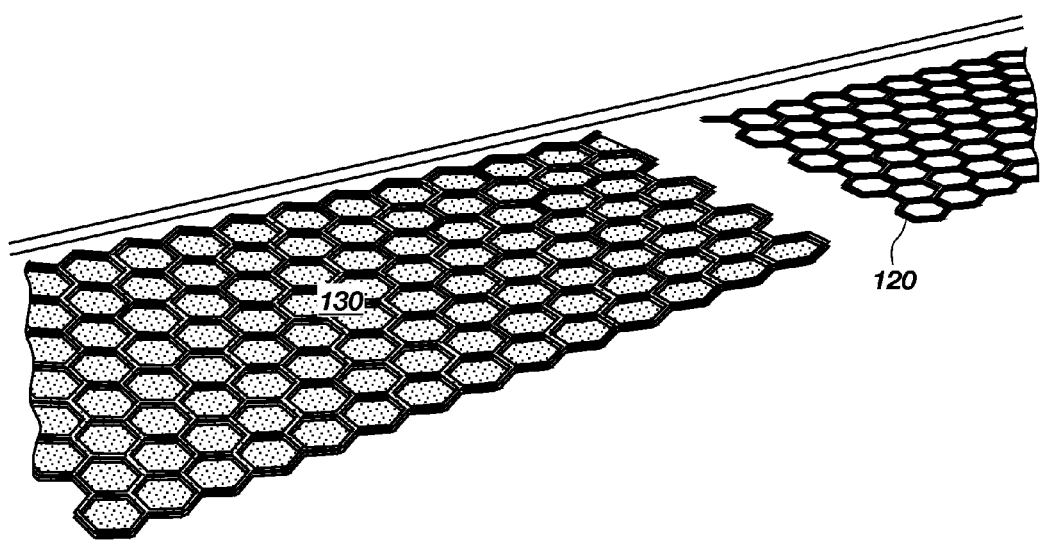

As shown in FIG. 9, a cured marble matrix grid 130 is then removed from mold 122. Cured marble matrix grid 130 is now ready for use, as described above. If desired, the resin within each polygon of the resin matrix grid 130 is removed to form the structured grid 120 discussed above and shown in FIG. 10.

The present embodiment discloses a structured grid 120 wherein each cell of structured grid 120 is hexagonally shaped. Alternatively, many other shapes may be used for the cells of structured grid 120, such as triangles, rectangles, circles, octagons, and the like. The purpose for structured grid 120 is to provide replicated shapes that are structured to minimize the amount of resin needed, while maintaining a strong backing for the resin panel being formed. The present embodiment discloses a structured grid 120 that is formed from a cured marble matrix. Other materials may be used for structured grid 120, such as fiberglass, metal and the like.

Alternately, in place of the structured grid 120, other core materials may be provided to strengthen the resin panel, such as balsa wood, foam, or plywood. Such an alternate support material must be suitable to not deteriorate where moisture is present, such as in a panel for a tub surround or a shower enclosure. Likewise, other suitable materials for support mat 110 may be used besides fiberglass. Support mat 110 may also be eliminated or replaced by some other means of providing support, such as a thin cultured marble layer (not shown).

Figure 11:
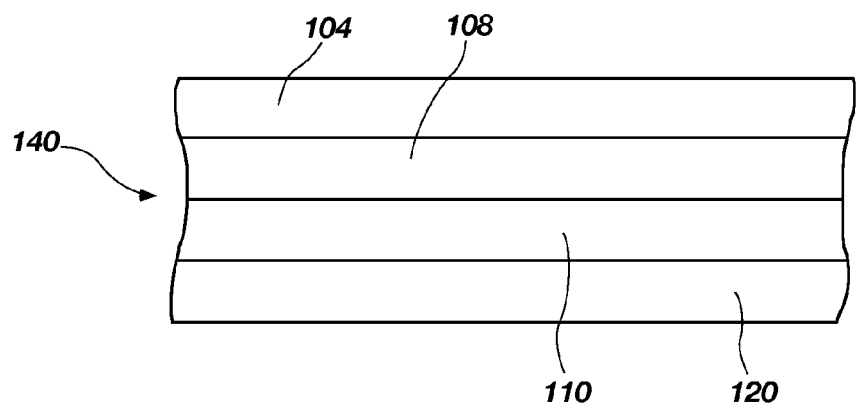
FIG. 11 is a side view of a resin panel having a honeycomb backing formed as described with respect to FIGS. 1-10.

FIG. 11 shows a side view of a resin panel 140 formed by the process described in FIGS. 1-10. Layer 104 at the outer surface of resin panel 140 is formed from the gelcoat or solid surface resin, as described with respect to FIG. 1. Thin layer 108, which may comprise pigmented resin, comes next, as described in FIG. 2, followed by support mat 110, such as the fiberglass support mat 110 discussed with respect to FIGS. 3-5, is positioned next to thin layer 108. Then a cured marble matrix, such as structured grid 120, provides a support for resin panel 140.

Resin panel with image and structured grid backing

As shown in FIGS. 12-16, according to the present invention, a resin panel may be formed with an image comprising a variety of patterns, designs, and/or colors on the surface of the resin panel. The present invention provides for the transfer of the image to the resin panel at room temperature and without applying pressure. This resin panel may be formed with the structured grid backing, as described in the embodiments shown in FIGS. 3-7.

Figure 12:
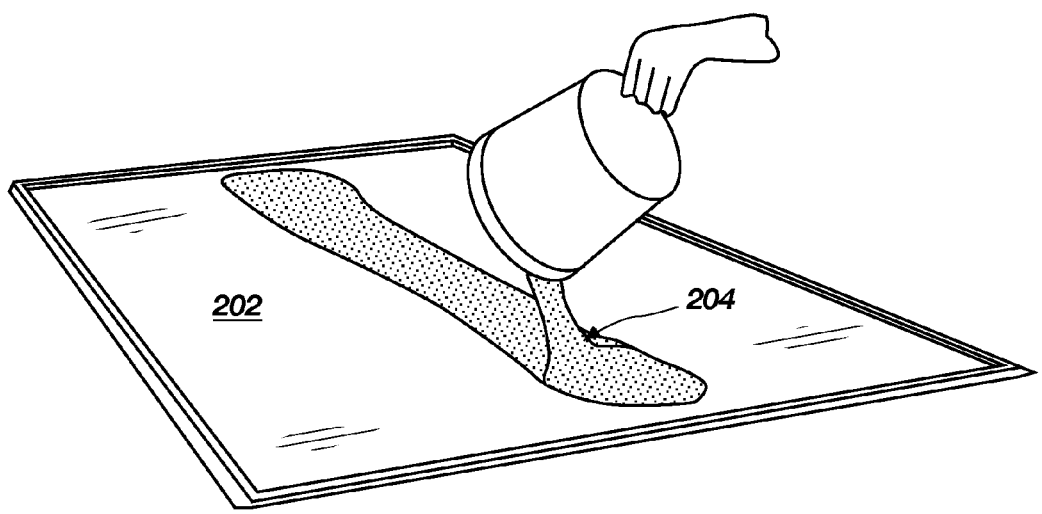
FIGS. 12-16 are a series of perspective views showing a process according to the present invention for making a resin panel having an image thereon and a honeycomb backing.
Figure 13:
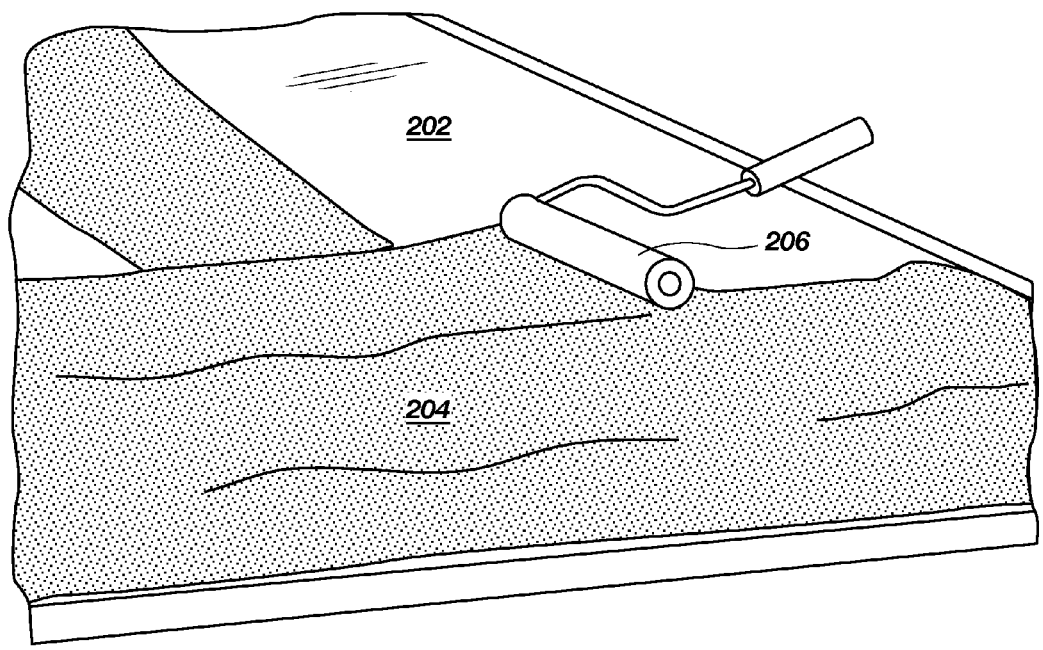

Looking first at FIG. 12, a pouring table 202 is provided and a resin 204 in liquid form is poured thereon. As shown in FIG. 13, resin 204 is spread with a metal roller 206 to a thin layer, which may have a thickness of about 30 mils (about 0.076 cm), for example.

Figure 14:
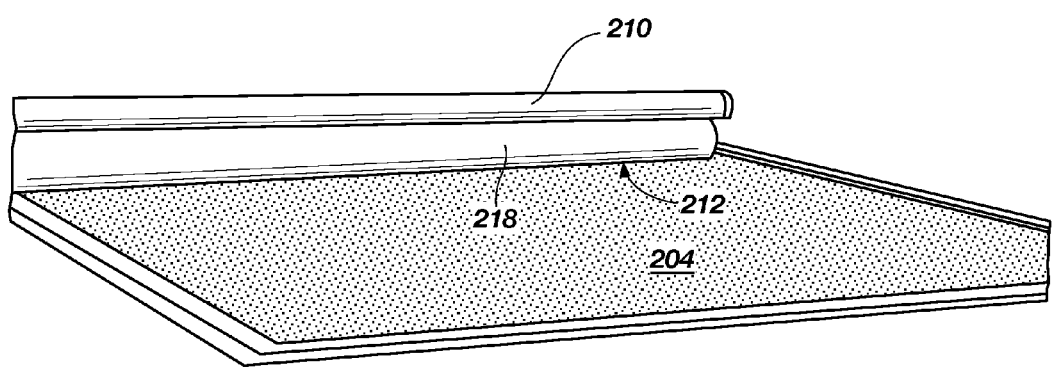
Figure 15:
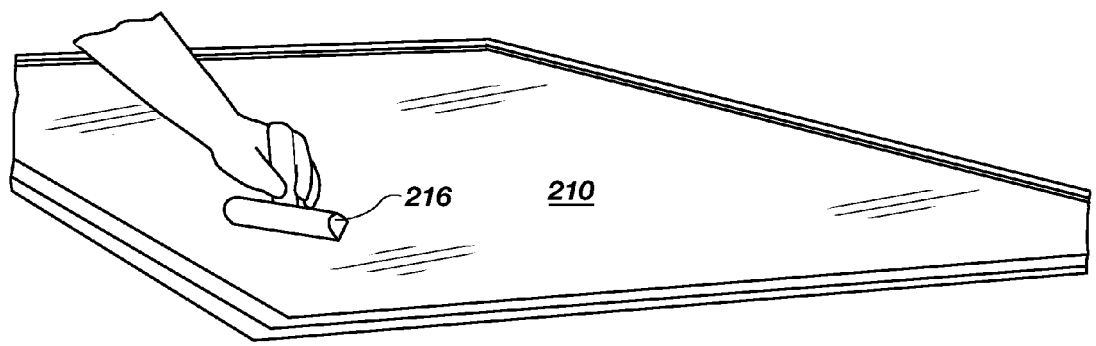

Next, at FIG. 14, after resin 204 has partially gelled, (e.g., by a catalyst, etc.), a film 210 is rolled with an image 212 facing down to come into contact with resin 204. Film 210 is rolled or pressed flat against resin 204 with a felt squeegee 218, as shown in FIG. 14. Looking at FIG. 15, a smoothing bar or scraper 216 is used to smooth out film 210 so as to pull out any air bubbles trapped thereunder. Looking at FIG. 16, film 210 is left in contact with resin 204 long enough for image 212 to transfer to resin 204. In the present embodiment, the contact time is about one hour. During that time, resin 204 and film 210 remain at ambient temperature and pressure, so that heated and pressurized presses are not required for the transfer of image 212.

Film 210 comprises a transfer medium having an image 212 thereon that is acquired from any of various means, such as a photograph or painting, and may be scanned into a computer for editing. The computer may then print image 212 on film 210 employing various inks or dyes that can be transferred to resins.

Figure 16:
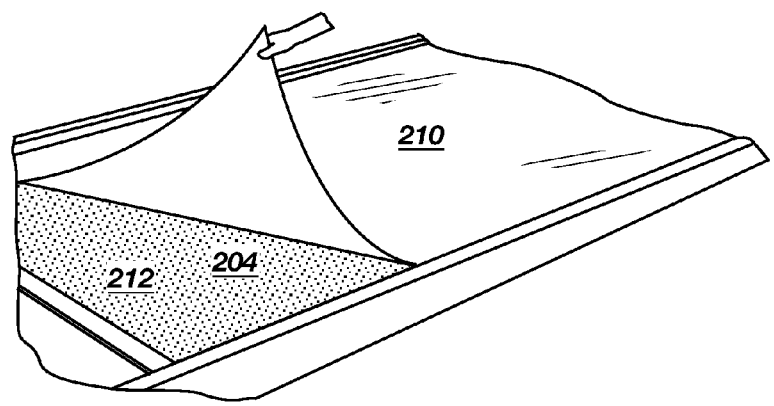

Referring to FIG. 16, after the transfer time has ended, film 210 is carefully peeled away from resin 204, leaving image 212 on resin 204.

Next, a thin layer 108 of resin and support mat 110 are applied, as described with respect to FIGS. 2-5. Then a structured grid 120 is applied, as described with respect to FIGS. 6 and 7, to provide support for the resin panel.

Figure 17:
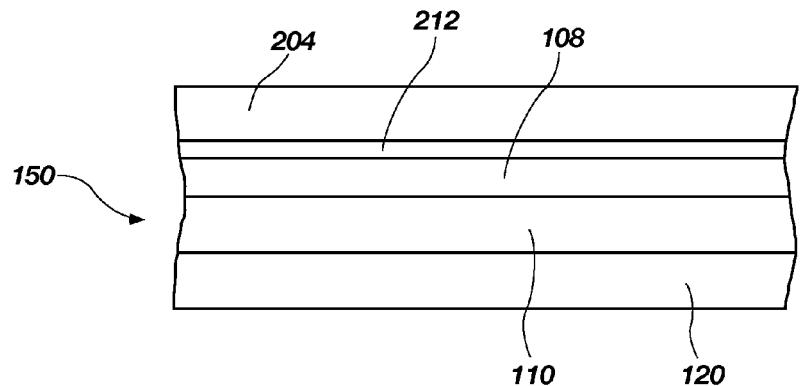
FIG. 17 is a side view of a resin panel having an image thereon and a honeycomb backing formed as described with respect to FIGS. 12-16 and FIGS. 3-7.

FIG. 17 is a side view of a resin panel 150 formed by the process described in FIGS. 12-18. Resin 204 is formed as described with respect to FIGS. 12 and 13. Image 212 is applied to resin 204, as described with respect to FIGS. 14-16. Then thin layer 108 is provided and support mat 110 is applied next to thin layer 108, as discussed with respect to FIGS. 2-5. Finally structured grid 120, such as a marble matrix, is affixed to provide strength to resin panel 150.

In the present invention, the reasons that the transfer of a printed image to a resin works well at room temperatures are not fully understood. Chemical absorption may occur, wherein a printed image on a transfer sheet transfers readily to polymer molecules of a resin in a viscous or gel state because the polymer molecules are more mobile than solid state molecules. This mobility may provide a high degree of bonding between ink or dye and polymer molecules of the resin that cannot be achieved with solid molecules in cured materials, unless sublimation dyes are used, accompanied by substantial heat and pressure. There could be some diffusion of an image into the resin occurring because of a relatively high solvent content of the resin.

In addition, the solvent content of the resin may cause a dissolving or swelling of a receptive coating for the ink or dye on the transfer sheet, thus weakening the receptive coating and facilitating image transfer of the ink or dye to the resin. The foregoing theories are conjecture and have no effect on the scope of this patent application. As used herein, the term "liquid resin" refers to a resin in various stages of curing from a pure liquid to a gel form. The resin may include filler and/or reinforcement.

According to the present invention, image transfer is accomplished without sublimation, opening up the use of less expensive inks and also providing improved lightfastness (such as solvent- or aqueous-based pigment inkjet inks) for the images. Thus, images are transferred quickly and inexpensively to substrates and coatings at room temperature using relatively inexpensive materials and yielding a higher quality product. Images are transferred to layers of resin that can be easily applied to any structure or surface.

Resin panel with image and cultured marble substrate backing

Rather than having a honeycomb grid backing for a resin panel, it may be desirable to have a resin panel with an image on the front and a cultured marble substrate backing. In this embodiment, the steps described and shown with respect to FIGS. 12-16 are carried out. Specifically, a layer of resin 204 in liquid form is poured and spread on a pouring table 202. Then, after resin 204 is partially gelled, a film 210 is rolled and pressed flat onto resin 204 with an image 212 on film 210 facing down to come into contact with resin 204. Image 212 is then transferred to resin 204 at ambient temperature and pressure, as described above. Then film 210 is removed from resin 204.

Figure 18:
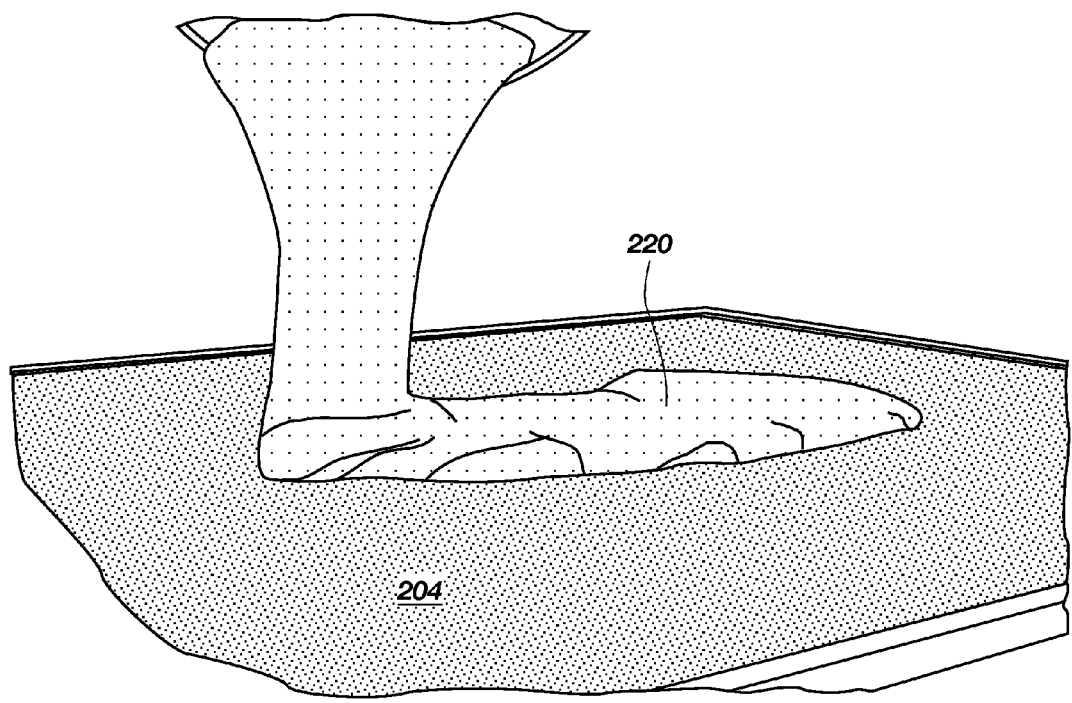
FIGS. 18-19 are perspective views showing a process for making a resin panel having a pattern, design, image, or color thereon and a solid cultured marble substrate.
Figure 19:
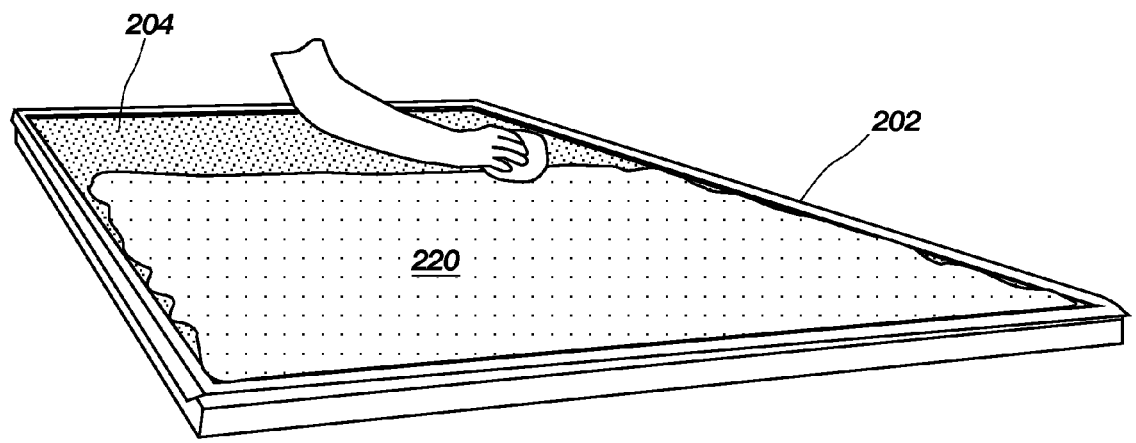

Next, the cultured marble substrate is formed. As shown in FIG. 18, a mixture of cultured marble matrix 220 is poured over resin 204. Cultured marble matrix 220 is then spread over resin 204 to a thickness of about 0.25 inch (about 0.64 cm), as shown in FIG. 19. Cultured marble matrix 220 may comprise various combinations of resin, marble filler, and catalyst. In one embodiment, cultured marble matrix 220 comprises 27% high strength polyester resin, 73% marble filler, and a catalyst (approximately 1% ratio to resin amount, by weight). Pigment may be added to obtain a selected color. For example, titanium dioxide may be added to achieve a white color. Pouring table 202 with the curing resin panel thereon is then set onto a curing rack. After curing is completed, the resin panel is removed from pouring table 202.

Figure 20:
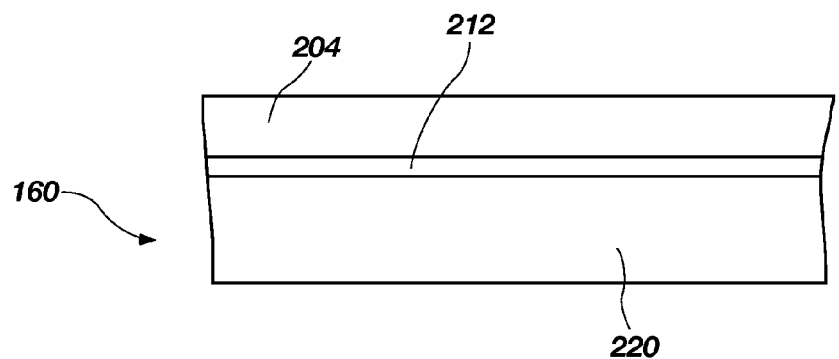
FIG. 20 is a side view of a resin panel having an image thereon and a cultured marble substrate formed as described with respect to FIGS. 12-16 and FIGS. 18-19.

FIG. 20 is a side view of a resin panel 160 formed by the process described with respect to FIGS. 12-16 and 18-19. Resin 204 is formed into a layer, as described with respect to FIGS. 12 and 13. Image 212 is applied to resin 204, as described in reference to FIGS. 14-16. Then cultured marble matrix 220 is formed over image 212 and resin 204, as described with respect to FIGS. 18 and 19, to provide strength for resin panel 160.

Resin Panel Trim with Image

In many applications of resin panels of the types described above having a pattern, design, image and/or color thereon, it is important to have panel trim members, or pieces, with rounded edges for finishing structures, such as bathroom walls, formed from resin panels. The present invention includes making such panel trim members, according to a process shown in FIGS. 21-24.

Figure 21:
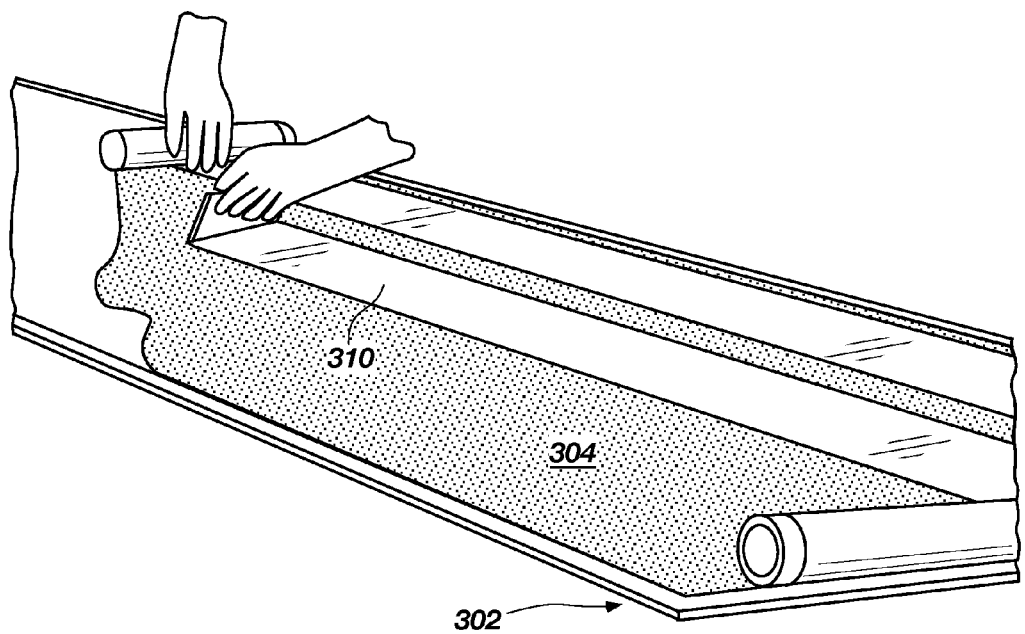
FIGS. 21-24 are a series of perspective views showing a process according to the present invention for making resin trim members having an image thereon.
Figure 22:
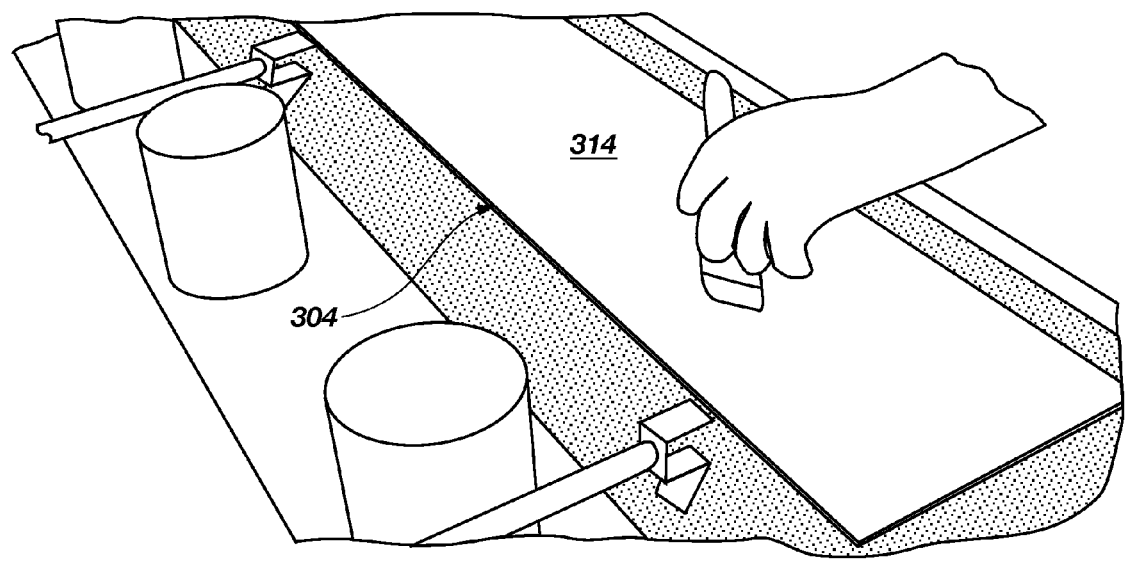

Looking at FIG. 21, a resin 304 is poured on a pouring table 302 and is spread to a thin layer, which may have a thickness of about 30 mils (about 0.076 cm), similar to the process described with respect to FIGS. 12 and 13. Then, as shown in FIG. 21, one or more film strips 310 are spread over portions of resin 304. After an image 308 (not shown) on each film strip 310 has transferred to resin 304, that film strip 310 is removed. Then, as shown in FIG. 22, resin 304 is brushed with a gelcoat 314, which may be white, and left to cure for about an hour.

Figure 23:
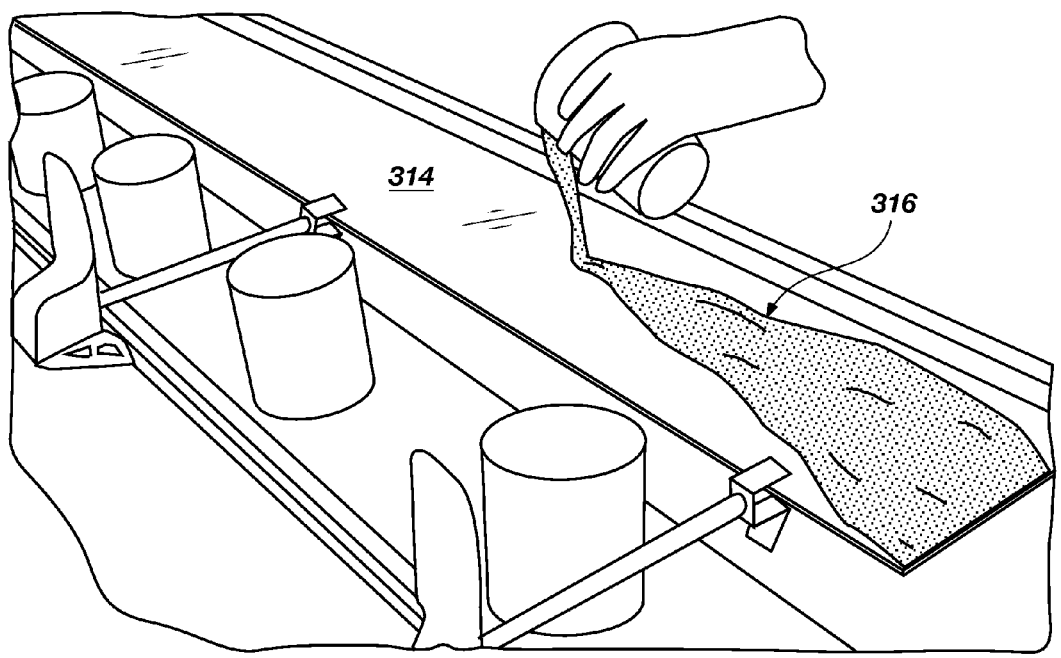
Figure 24:
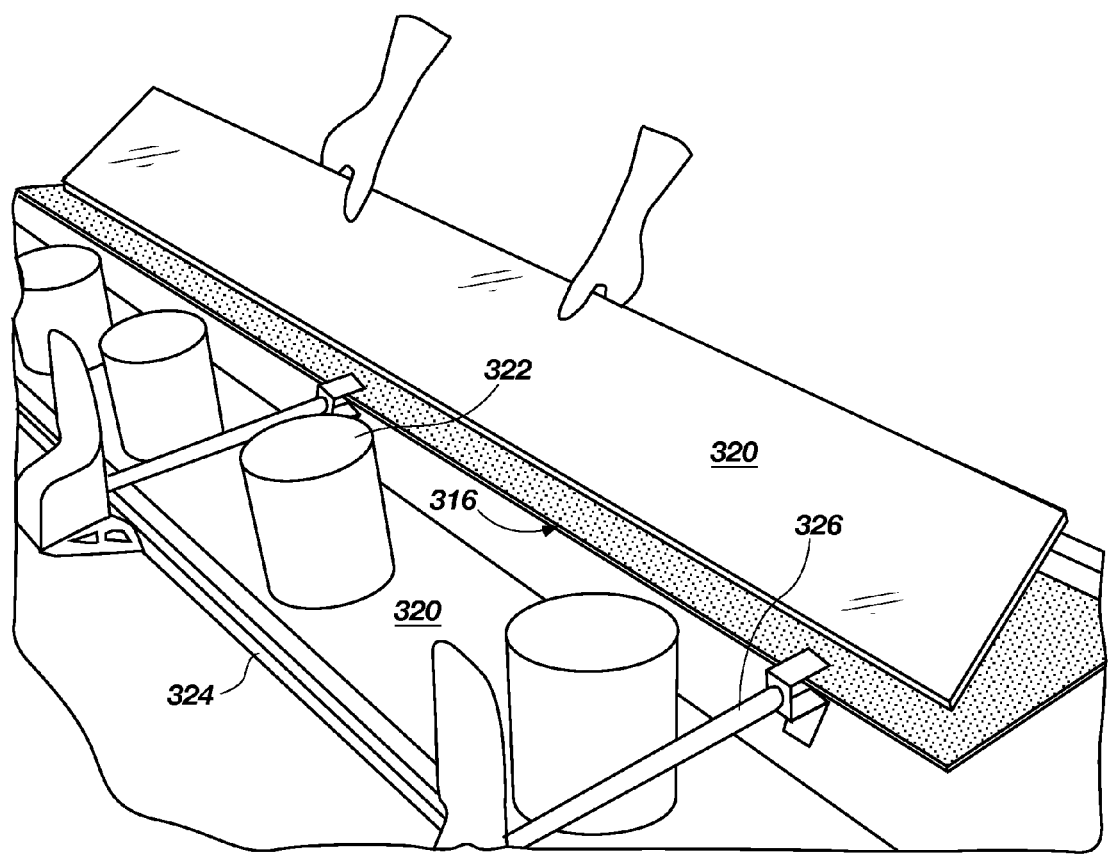

Referring to FIG. 23, a layer 316 of resin (e.g., marble resin, titanium dioxide (for white color) and catalyst) is poured over gelcoat 314. Then, as shown in FIG. 24, a blank trim piece 320, which may be made of medium density fiberboard (MDF) or cured cultured marble, is laid on layer 316 and is weighed down with steel weights 322. The edges of resin 304 (FIGS. 21, 22 and 25), image 308 (FIG 25), gelcoat 314 and layer 316 are rolled up on the edge of trim piece 320 by metal bars 324 and clamps 326 and held in place until the resin trim member is cured.

Figure 25:
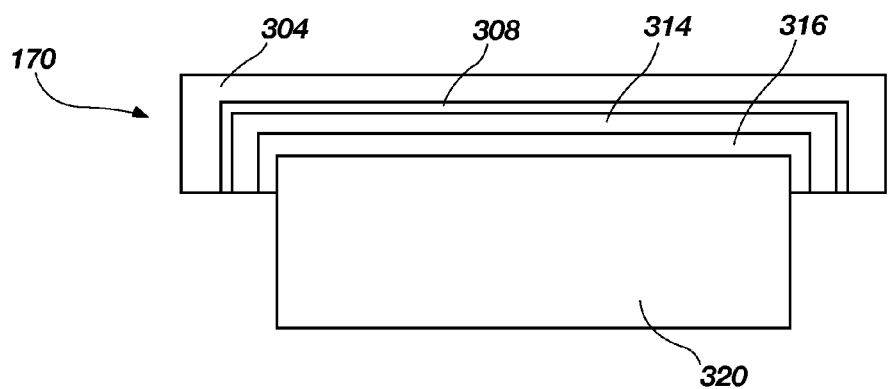
FIG. 25 is a side view of a resin trim member having an image thereon, as described with respect to FIGS. 21-24.

The resulting resin trim member 170 is shown in FIG. 25. Resin 304 provides a hard resistance surface for resin trim member 170. Next to resin 304 is image 308. Gelcoat 314 provides backing for image 308 and resin 304. Layer 316 comes next, followed by blank trim piece 320. The edges of resin 304, image 308, gelcoat 314, and layer 316 are rolled up on the edge(s) of blank trim piece 320 to provide a finished resin trim member 170.

EXAMPLES

Example A

A specific example of a honeycomb backing process, as shown in FIGS. 1-7, is described as follows. After a top coat process is completed by forming a layer of resin, as described. Resin is weighed out at 115 grams per square foot (929.03 $cm^2$) of top coat. Liquid white pigment is added to the resin at 3%, by weight, and mixed. MEKP catalyst is added at 1.5% of resin weight and mixed. The catalyzed mixture is poured over the top coat and brushed for complete coverage with a bristle brush.

One layer of 0.75 ounce to one ounce (about 21.3 g to about 28.3 g) fiberglass mat is now laid down on the surface and pressed against the resin mixture with a "stippling" stroke of the brush or with the use of a roller, so that the mat becomes saturated with resin. Next a structured grid panel or blank is laid down on top of the resin-saturated mat and pushed down with medium pressure. The panel is left to cure and then is removed from a pouring table for detailing.

Example B

The process was used which is described above with respect to FIGS. 12-16 above. All activities were conducted at room temperature, between 65-75° F. The mold or table surface was cleaned and prepared. The surface was framed off to the dimensions of the desired part, using layers of tape or adhesive strips to achieve a height of about 35 mils to about 40 mils (about 0.089 cm to about 0.102 cm) above the surface. A solid surface polyester resin was mixed with MEKP initiator, 3%, by weight. The solid surface polyester resin was poured into the framed area of the table and vibrated to release trapped air. The solid surface polyester resin was allowed to set for 11-15 minutes until the solid surface polyester resin began to gel.

A printed transfer medium having a pigment ink design thereon was laid face down on the solid surface polyester resin, and the air bubbles were pushed out with a smoothing bar as the printed transfer medium made contact with the solid surface polyester resin. The printed transfer medium was allowed to remain on the solid surface polyester resin for 20-40 minutes. Separate test strips were used to determine when absorption of printing from the printed transfer medium was complete. The transfer medium was carefully peeled off the solid surface polyester resin.

The solid surface polyester resin, now bearing printing from the transfer medium, was then ready to serve as a coating for a substrate. A cultured marble matrix was mixed, comprising resin, inert calcium carbonate filler, pigment, and initiator. The cultured marble matrix was allowed to gel for 20-28 minutes. The finished product was removed from the surface of the mold or table.

Advantages and Applications

From the foregoing description, the advantages of the various embodiments of the present invention can be seen. Polygonal backing embodiments substantially reduce the amount of resin needed for a resin panel while maintaining essentially the same resin panel strength. The support mat provides additional support to the structure. The resin panel weight is substantially reduced, making it easier to transport and handle resin panels having polygonal backings, as compared to resin panels with resin matrix backings.

In addition, resin panel embodiments are provided enabling the transfer of patterns, designs, shapes and/or colors, and images to resin panels or resin trim members at ambient temperature and pressure without the need for expensive heated presses.

Moreover, expensive sublimation inks and their associated specialty coated receptive materials are not needed. Instead, inexpensive solvent- or aqueous-based inks may be used to apply images to generic, inexpensive transfer media. If pigmented inks are chosen, the need for UV-resistant coatings is mitigated, thus reducing the number of requirements placed on a protective overcoat. If dye-based inks are chosen, UV-resistant materials may be incorporated into the protective overcoat, as the application allows. In either case, the protective overcoat provides oxidation protection to the image, along with improved aesthetics.

Moreover, the number of manufacturing steps and the time required for making imaged structures are substantially reduced, since the imaging and curing processes may be simultaneously carried out. In addition, the manufacture of thin imaged resin layers opens up many additional applications to many natural and man-made materials.

Many applications are available for the present invention. For example, in homes, the panel materials may be used for kitchen and bathroom surfaces, such as walls, countertops, vanity tops, sinks, bathtubs, showers, tub splashes, and the like.

Although the above embodiments are representative of the present invention, other embodiments will be apparent to those skilled in the art from a consideration of this specification and the appended claims, or from a practice of the embodiments of the disclosed invention. It is intended that the specification and embodiments therein be considered as exemplary only, with the present invention being defined by the claims and their equivalents.

The subject matter claimed is:

1. A process for making a patterned resin panel having a pattern visible on a front layer and a grid support backing, comprising:
    (a) applying a first layer of resin to a surface of a mold,
    (b) with the resin of the first layer cured enough to be substantially solid and to substantially retain its shape, applying a medium with a pattern printed on a side thereof to the first layer, with the side of the medium in contact with the resin,
    (c) curing the resin of the first layer at ambient temperature and pressure to transfer the pattern from the medium to the resin,
    (d) before the resin of the first layer is fully cured, removing the medium from the resin,
    (e) applying a second layer of resin to a surface of the resin of the first layer,
    (f) affixing a structured grid to a top surface of the second layer of resin,
    (g) curing the resin of the second layer at ambient temperature and pressure, so that the structured grid is integral with the second layer to form a patterned resin panel, and
    (h) removing the patterned resin panel from the mold.

2. The process of claim 1 wherein the mold is generally flat.

3. The process of claim 1, further comprising affixing a support mat between the top surface of the second layer and the structured grid to form a support layer.

4. The process of claim 3 wherein the support layer comprises a fiberglass mat.

5. The process of claim 3, wherein the fiberglass mat is saturated with the resin of the second layer.

6. The process of claim 1, wherein the resin of the second layer is pigmented.

7. The process of claim 1, wherein the structured grid includes a pattern of interconnected polygons.

8. The process of claim 7, wherein the structured grid includes a pattern of interconnected hexagons.

9. A process for making a patterned resin panel, comprising:
    (a) printing a pattern onto one side of a transfer medium;
    (b) applying a topcoat resin in liquid form and a catalyst within a receptacle of a mold, the receptacle defined by a smooth glass surface and a framework bounding the smooth glass surface, to define a pattern topcoat of a panel, the smooth glass surface defining a smooth outer surface of the pattern topcoat,
    (c) after the topcoat resin has at least partially polymerized, before the topcoat resin has fully cured, but the topcoat resin has cured enough so that the pattern topcoat is substantially solid and substantially retains its shape, and while a rear surface of the pattern topcoat, opposite from the smooth outer surface of the pattern topcoat, remains tacky, applying the transfer medium with the pattern printed on the one side to the rear surface of the pattern topcoat, with the one side of the transfer medium and the pattern being in contact with the rear surface of the pattern topcoat,
    (d) while the one side of the transfer medium and the pattern remain in contact with the rear surface of the pattern topcoat, continuing to cure the topcoat resin at substantially ambient temperature and substantially ambient pressure to bond the pattern to the rear surface of the pattern topcoat,
    (e) after the pattern has bonded to the rear surface of the pattern topcoat, but before the topcoat resin is fully cured, removing the transfer medium from the rear surface of the pattern topcoat, and
    (f) with the pattern exposed, applying a substrate resin onto the pattern and the rear surface of the pattern topcoat to form a substrate, with the pattern located between the pattern topcoat and the substrate resin.

10. The process of claim 9, further comprising:
    (g) curing the substrate resin at substantially ambient temperature and substantially ambient pressure to form the substrate, so that the pattern topcoat and the substrate form an integral patterned panel, and
    (h) removing the integral patterned panel from the mold.

11. The process of claim 9, wherein printing the pattern onto the one side of the transfer medium comprises selectively applying an organic solvent-based ink including a colored pigment or an organic solvent-based dye to the one side of the transfer medium.

12. The process of claim 10, wherein applying the substrate resin onto the pattern and the rear surface of the pattern topcoat comprises applying a matrix of liquid resin, filler and a hardening catalyst to the rear surface of the pattern topcoat.

13. A process for making a patterned trim piece for a patterned resin panel, comprising:
    (a) printing a pattern onto one side of a transfer medium,
    (b) defining a transfer medium strip from the transfer medium,
    (c) applying a topcoat resin in liquid form and a catalyst within a receptacle of a mold, the receptacle defined by a smooth glass surface and a framework bounding the smooth glass surface, to define a pattern topcoat strip for a patterned trim piece for a patterned resin panel, the smooth glass surface defining a smooth outer surface of the pattern topcoat strip,
    (d) after the topcoat resin has at least partially polymerized enough to be substantially solid and to substantially retain its shape, but before the topcoat resin has fully cured and while a rear surface of the pattern topcoat strip, opposite from the smooth outer surface of the pattern topcoat strip, remains tacky, applying the transfer medium strip with the pattern printed on the one side of the transfer medium to the rear surface of the pattern topcoat strip, with the pattern and the one side of the transfer medium being in contact with the rear surface of the pattern topcoat strip,
    (e) while the one side of the transfer medium and the pattern remain in contact with the rear surface of the pattern topcoat strip, continuing to cure the topcoat resin at substantially ambient temperature and substantially ambient pressure to bond the pattern to the rear surface of the pattern topcoat strip,
    (f) after the pattern has bonded to the rear surface of the pattern topcoat strip, but before the topcoat resin of the pattern topcoat strip is fully cured, removing the transfer medium strip from the rear surface of the pattern topcoat strip,
    (g) with the pattern exposed on the rear surface of the pattern topcoat strip, applying a gelcoat onto the pattern and the rear surface of the pattern topcoat strip, applying a marble resin layer to the gelcoat and applying a trim piece to the marble resin layer, and
    (i) curing the marble resin layer.

14. The process for making a patterned resin panel of claim 9, wherein applying the substrate resin includes:
    applying a gelcoat to the rear surface of the pattern topcoat and
    applying a marble resin layer to the gelcoat.

15. The process of making a patterned trim piece for a patterned resin panel of claim 13, further comprising:
    (i) rounding edges of the pattern topcoat, the gelcoat and the marble resin layer around front corners of the trim piece and maintaining the rounded edges until curing the pattern topcoat and the marble resin layer is finished.

* * * * *